United States Patent
Kim et al.

(10) Patent No.: US 11,292,431 B2
(45) Date of Patent: Apr. 5, 2022

(54) USE OF INTERPRETIVE META-INSTRUCTIONS TO IMPLEMENT VARIOUS RKE PROTOCOLS

(71) Applicant: Continental Intelligent Transportation Systems, LLC, Santa Clara, CA (US)

(72) Inventors: Yong Kim, San Jose, CA (US); Nikolas Bergerhoff, North Vencouver (CA); Ritesh Ahuja, Cupertino, CA (US)

(73) Assignee: Continental Intelligent Transportation Systems, LLC, San Jose, CA (US)

( * ) Notice: Subject to any disclaimer, the term of this patent is extended or adjusted under 35 U.S.C. 154(b) by 0 days.

(21) Appl. No.: 16/960,842

(22) PCT Filed: Jan. 7, 2019

(86) PCT No.: PCT/US2019/012489
§ 371 (c)(1),
(2) Date: Jul. 8, 2020

(87) PCT Pub. No.: WO2019/136352
PCT Pub. Date: Jul. 11, 2019

(65) Prior Publication Data
US 2020/0339067 A1    Oct. 29, 2020

Related U.S. Application Data

(60) Provisional application No. 62/614,802, filed on Jan. 8, 2018.

(51) Int. Cl.
*B60R 25/24* (2013.01)
*H04W 12/06* (2021.01)

(52) U.S. Cl.
CPC ............. *B60R 25/24* (2013.01); *H04W 12/06* (2013.01); *B60R 2325/10* (2013.01)

(58) Field of Classification Search
CPC . B60R 25/24; B60R 2325/10; B60R 25/2018; G07C 9/00309; G07C 9/00571;
(Continued)

(56) References Cited

U.S. PATENT DOCUMENTS 4,623,887 A * 11/1986 Welles, II ............... G08C 19/28
340/12.24
4,942,552 A *  7/1990 Merrill ..................... H04Q 9/14
710/6

(Continued)

FOREIGN PATENT DOCUMENTS

CN        103903091 A    7/2014
CN        108011912 A    5/2018
(Continued)

OTHER PUBLICATIONS

International Search Report dated Apr. 24, 2019 of PCT/US2019/012489.

*Primary Examiner* — Edwin C Holloway, III

(57) ABSTRACT

Interpretive meta-instructions are used, at a connected vehicle access system (CVAS) device, to implement various RKE protocols by: receiving an RKE-protocol-specific meta-instruction that has been generated by a back-end server; generating an RKE telegram based on the RKE-protocol-specific meta-instruction; and transmitting the RKE telegram to a vehicle. The meta-instruction may include: a device configuration that specifies a set of RF parameters of a CVAS-device transceiver; a template telegram that contains a first set of data fields with data values from the back-end server and that contains a second set of data fields for which data values will be generated and inserted at the CVAS device; and localization-processing commands containing instructions for modifying the second set of data fields of the template telegram.

4 Claims, 2 Drawing Sheets

(58) Field of Classification Search
CPC .... G07C 2209/10; H04W 12/06; H04W 4/48; H04W 4/44; H04W 12/04; H04L 67/34; H04L 69/18; H04L 67/125
USPC .............................................. 340/5.64, 5.72
See application file for complete search history.

(56) References Cited

U.S. PATENT DOCUMENTS

| | | | | |
|---|---|---|---|---|
| 5,187,793 | A * | 2/1993 | Keith | G06F 9/3017 |
| | | | | 711/125 |
| 6,700,476 | B1 * | 3/2004 | Okada | B60R 25/04 |
| | | | | 340/12.51 |
| 7,039,397 | B2 * | 5/2006 | Chuey | G08C 17/02 |
| | | | | 340/5.23 |
| 7,414,522 | B2 | 8/2008 | Conner et al. | |
| 7,778,213 | B2 | 8/2010 | Alrabady et al. | |
| 7,936,287 | B1 * | 5/2011 | Lee | G06F 9/54 |
| | | | | 341/23 |
| 9,483,886 | B2 * | 11/2016 | Bergerhoff | H04W 12/06 |
| 2007/0096940 | A1 * | 5/2007 | Laranang | G06Q 10/00 |
| | | | | 340/13.24 |
| 2011/0112969 | A1 | 5/2011 | Zaid et al. | |
| 2012/0254960 | A1 | 10/2012 | Lortz et al. | |
| 2013/0069761 | A1 | 3/2013 | Tieman | |
| 2014/0218165 | A1 * | 8/2014 | Johnson | G07C 9/00857 |
| | | | | 340/5.25 |
| 2016/0098870 | A1 * | 4/2016 | Bergerhoff | H04W 12/06 |
| | | | | 340/5.61 |
| 2017/0053470 | A1 | 2/2017 | Bergerhoff et al. | |
| 2017/0345240 | A1 | 11/2017 | Bergerhoff et al. | |
| 2018/0009416 | A1 | 1/2018 | Maiwand et al. | |

FOREIGN PATENT DOCUMENTS

| | | |
|---|---|---|
| DE | 102014222424 A1 | 5/2016 |
| EP | 2573738 A1 | 3/2013 |
| WO | 2016054276 A1 | 4/2016 |
| WO | 2016132078 A1 | 8/2016 |
| WO | 2017205207 A1 | 11/2017 |

* cited by examiner

USE OF INTERPRETIVE META-INSTRUCTIONS TO IMPLEMENT VARIOUS RKE PROTOCOLS

BACKGROUND

Embodiments of the invention relate generally to remote access control for motor vehicles. Typically, physical key fobs are created and sold with a particular vehicle to allow remote access into a vehicle.

U.S. Pat. No. 9,483,886 to Bergerhoff, et al., entitled Method and system for remote access control, which is incorporated herein by reference, discloses a method to learn and then pair with a pre-installed access control system of a vehicle. Communication is exchanged between the access control system and a backend cloud-based system. Required data of the access control system including its particular authentication code is extracted by a learning device. A vehicle matching data is sent to the backend cloud-based system and the vehicle is registered with the backend cloud-based system. The learning device is registered to the access control system in accordance with learning procedures implemented in the vehicle as remote entry key. The learning device is coupled to a Radio Frequency signal transmitter that has Application-Specific Integrated Circuits to generate stable RF signals at multiple frequency wavelengths. Registration of learning device includes, receiving a first access control telegram message, transmitting the first access control telegram message to the access control system, pairing the learning device with the access control system.

Out of the roughly 1 billion light vehicles currently on the road, new key devices for vehicle access and start may be programmed by a consumer without any dealer involvement for up to about 30-50% of those vehicles. Vehicles built until 2006-2010 typically allow the owner to add additional keys, which the owner can "learn" to their vehicle. An owner would have to have a valid key that came with the car, and, perhaps go through a predefined sequence, such as turning on and off the ignition multiple times within a predefined period of time (e.g., 4 times within 30 seconds) or unlocking and locking the power door locks a predetermined number of times within a predetermined period of time. The vehicle will then typically give an indication that it is in a mode to learn additional keys. For example, the vehicle may provide an audible indication, such a chime. A new unprogrammed key (also referred to as a virgin key) may then be recognized by the vehicle through a process in which the virgin key transmits a radio frequency ("RF") telegram, and the vehicle accepts the credentials from the key and stores those credentials in an electronic control unit, such as the vehicle's body controller. On newer models, a similar procedure may also be performed over a low frequency ("LF") immobilizer interface by putting the new key into the ignition or near a pushbutton used for starting the vehicle or some other predefined location within the vehicle. In this way, the secrets and the rolling-code counter, which are required to synchronize a new key with the vehicle may be provided to, and stored in, the new key.

Generally, there are three types of access control systems for vehicles. First, a mechanical blade to both unlock the door and start the engine. Second, came Remote Keyless Entry (RKE), which allows users to press a key on a fob to unlock the door. An anti-theft option also was introduced with RKE. Anti-theft is typically implemented with a coil around the ignition switch. The coil is connected to an immobilizer, which prevents unauthorized starting of the vehicle's engine. The coil communicates an LF signal to a transponder in the head of the key, which changes or validates a secret code, which allows the engine to start. Third, passive systems work without actively operating the authorization device. The key can remain in the vehicle operator's pocket, for example. When a door handle or a button on the door handle is touched, the vehicle sends a signal to the fob, which responds with a proper signal, and then the vehicle unlocks, which is essentially hands-free operation with respect to the fob. Similarly, once inside the vehicle, upon pressing a start button, for example, antennas within the vehicle send a signal to the fob, which responds via RF thereby allowing the vehicle's engine to be started. This replaces the need, in the RKE systems with anti-theft, to place the place the fob or a key close to the immobilizer coil in order to start the engine. Passive mode only works when the fob battery is charged. If the fob battery is flat (i.e., discharged), a mechanical key would have to be used to unlock the car. That is so-called limp-home mode for unlocking a car that has passive entry. Limp-home mode for starting the engine for a car with passive start is the same as the RKE system with anti-theft, which means that the fob will be placed near the immobilizer coil, which will provide energy to the microcontroller in the fob to respond with a secret code so that the vehicle can be started even when the fob battery is discharged.

Vehicle access (i.e., unlocking a vehicle's door) involves a unidirectional communication. A button is pressed on a remote-control key fob, which causes the fob to send out a telegram to the vehicle. The vehicle and the key share a common secret. The algorithm that generates an appropriate code is called a rolling code. The algorithm is known to both the key and the car. A command, such as lock or unlock, is transmitted along with the next valid rolling code. The most recently used rolling code gets stored. Then an algorithm is used to generate the next rolling code based on the most recently used rolling code. The vehicle then accepts only future rolling codes, relative to the most recently used rolling code, which prevents a so-called replay attack.

For start authorization, the communication scheme that is implemented on every car is a so-called challenge-response scheme. The car and the legitimate key, once it is programmed, share one secret, which is a bit pattern that is identical and which is referred to as a secret key. Both have the same secret key. The vehicle generates a random number, which is called a challenge, and sends the random number to the key. The vehicle then takes the random number that it just generated and runs it through a cryptology algorithm, e.g., HITAG 2, which uses the secret key to produce a result. The key does the same thing. The key also runs the random number received from the vehicle through the cryptology algorithm, which uses the secret key to produce a result, which is called a response. The key then sends this response back to the car, which checks whether the response matches the expected value calculated by the vehicle. If the response is correct, then the vehicle allows the key to start the vehicle.

Vehicle implementations for RKE, PASE (Passive Start and Entry), and Immobilizer are highly fragmented between different vehicle models in their respective RF protocols, LF protocols, learning procedures, and the like. Conventional vehicle keys, therefore, will typically work with only one particular vehicle model. Such keys have a single communications protocol, for example, adapted for use with a single vehicle model.

Remote controller key fobs for accessing a vehicle typically use radio signals and proprietary data formats to communicate to the vehicle. As the automotive industry is gearing towards connected car era, many of vehicle manufacturers are trying to provide drivers with convenient ways to share a vehicle in small and large scale, often times utilizing smartphones to access the vehicle.

A significant obstacle is that each vehicle requires specific key fobs that implement an RKE protocol that is compatible with very few vehicle models. Further, key fobs typically support only one RKE protocol.

Currently many different RKE protocols exist and implementing all (or almost all of) the various RKE protocol in a vehicle-access device isn't efficient and may expose security vulnerabilities.

A structured way to support multiple RKE protocols by one device directly/indirectly connected to a remote server would be an improvement.

BRIEF SUMMARY

Embodiments of the invention are directed to using interpretive meta-instructions, at a connected vehicle access system (CVAS) device, to implement various RKE protocols by: receiving an RKE-protocol-specific meta-instruction that has been generated by a back-end server; generating an RKE telegram based on the RKE-protocol-specific meta-instruction; and transmitting the RKE telegram to a vehicle. The meta-instruction may include: a device configuration that specifies a set of RF parameters of a CVAS-device transceiver; a template telegram that contains a first set of data fields with data values from the back-end server and that contains a second set of data fields for which data values will be generated and inserted at the CVAS device; and localization-processing commands containing instructions for modifying the second set of data fields of the template telegram.

DETAILED DESCRIPTION

Figure 1:
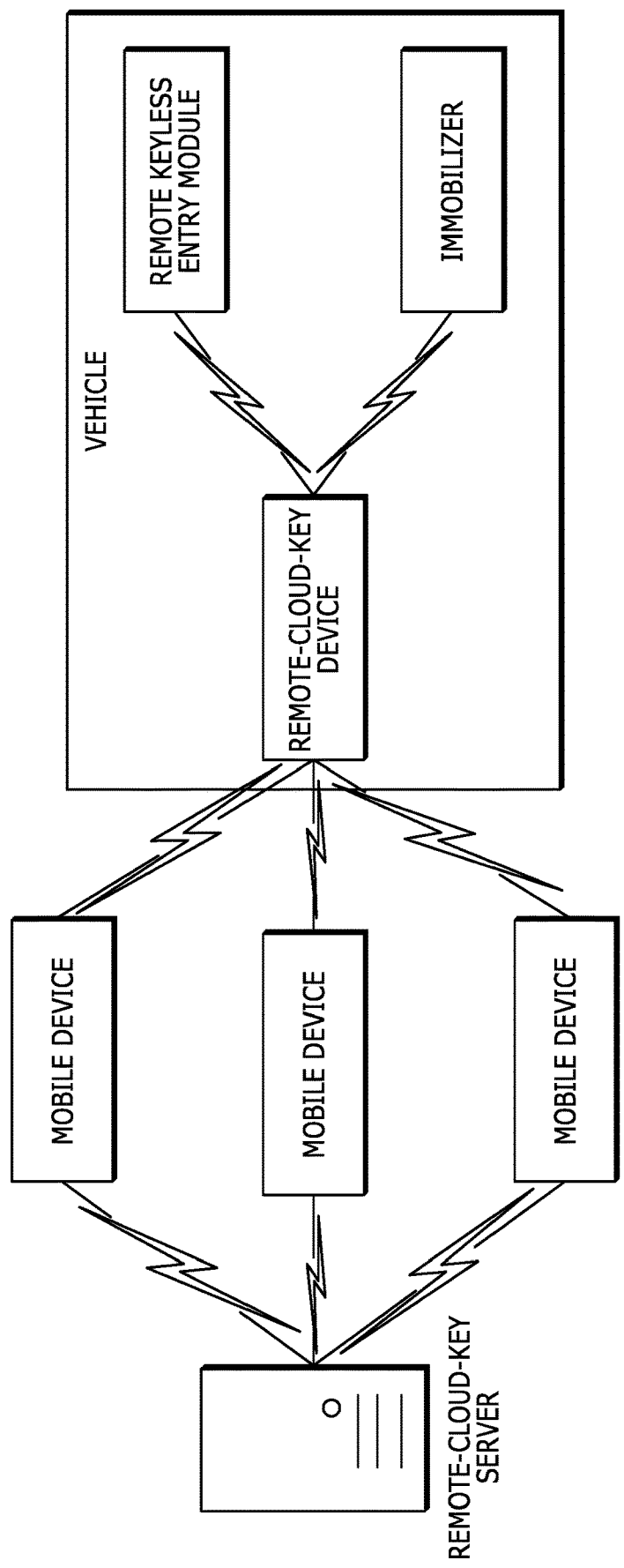
FIG. 1 depicts an operating environment for embodiments of the invention.

FIG. 1 depicts an operating environment for embodiments of the invention. As depicted in FIG. 1, a Remote-Cloud-Key server (also referred to as a backend server) communicates wirelessly with a plurality of mobile devices (e.g., smartphones), which execute a Connected Vehicle Access System (CVAS) mobile app. The mobile apps communicate wirelessly with a Remote-Cloud-Key (RCK) device (also referred to as a CVAS device) in a vehicle. From the point of view of the Remote Keyless Enty (RKE) module and the immobilizer in the vehicle, the RCK device appears to be simply an authorized key device that has been learned to the vehicle when the RCK device transmits commands, which it receives from the server via one of the mobile devices. Such commands may be cached by mobile devices, and there is limited range of valid rolling codes that the vehicle will accept at any particular time. As such, preventing the rolling codes sent by the RCK device to the vehicle from getting outside of the acceptable range by efficiently using rolling codes and minimizing wasted rolling codes improves operation of the system.

Embodiments of the invention are directed to ways to implement various RKE (Remote Keyless Entry) protocols for CVAS (connected vehicle access system) such as conventional key fobs, Bluetooth-enabled key fobs, CSM (Car Share Module), etc.

The CVAS (connected vehicle access system) enables access to the vehicle entry and engine start by downloading necessary authenticated commands from a remote server, then using the information contained in the command to set up the device configuration of the CVAS device, do localized processing to generate telegrams, and then transmit the telegram to unlock locked doors of the vehicle, enable starting of the vehicle, and the like.

To unlock/lock the vehicle, start the engine, or open the trunk, some vehicles require telegrams only from the CVAS device to the car. In such a case, the remote server connected to the CVAS device may generate an authenticated telegram and then transmit the data to the car.

On the other hand, some vehicles require bi-directional communication so that the next communication between the CVAS device and the vehicle should take into account the response information delivered from the vehicle to the CVAS device triggered by the previous communication. This bi-directional communication requirement inhibits the remote server from generating the whole authenticated telegram without having the response information available on the server side. On many occasions, the CVAS device cannot communicate back to the remote server to deliver the response information for various reasons such as being out of wireless network coverage, or the car being located in an underground parking structure, or a temporary server shutdown. Some vehicles require multiple bi-directional communications between the vehicle and the CVAS device in a timely manner, so generating the authenticated telegrams and conducting the bidirectional communication may not be possible within applicable time constraints.

One more consideration regarding the bi-directional communication is, to support multiple RKE protocol by one CVAS device, the CVAS device should either (1) contain all the various protocol-data-generation algorithms prior to the access to the car, or (2) download the necessary information from the remote server and then generate the telegram based on the downloaded information.

Embodiments of the invention are directed to defining an RKE-protocol-data-generation algorithm and to using downloaded data to generate authenticated telegrams to be sent to the vehicle.

The localization process is the way the CVAS device generates necessary telegrams by combining the server-initiated operation (meta-instruction) with local operations happening inside the remote cloud key device to modify some part of the template telegram, for example, including Rolling Code and/or Message Authentication Signature.

The local operation contains minimum logic to manipulate only necessary part of server-generated telegram (i.e. template telegram) so that still majority of the RKE protocol algorithm is implemented at the remote server.

Figure 2:
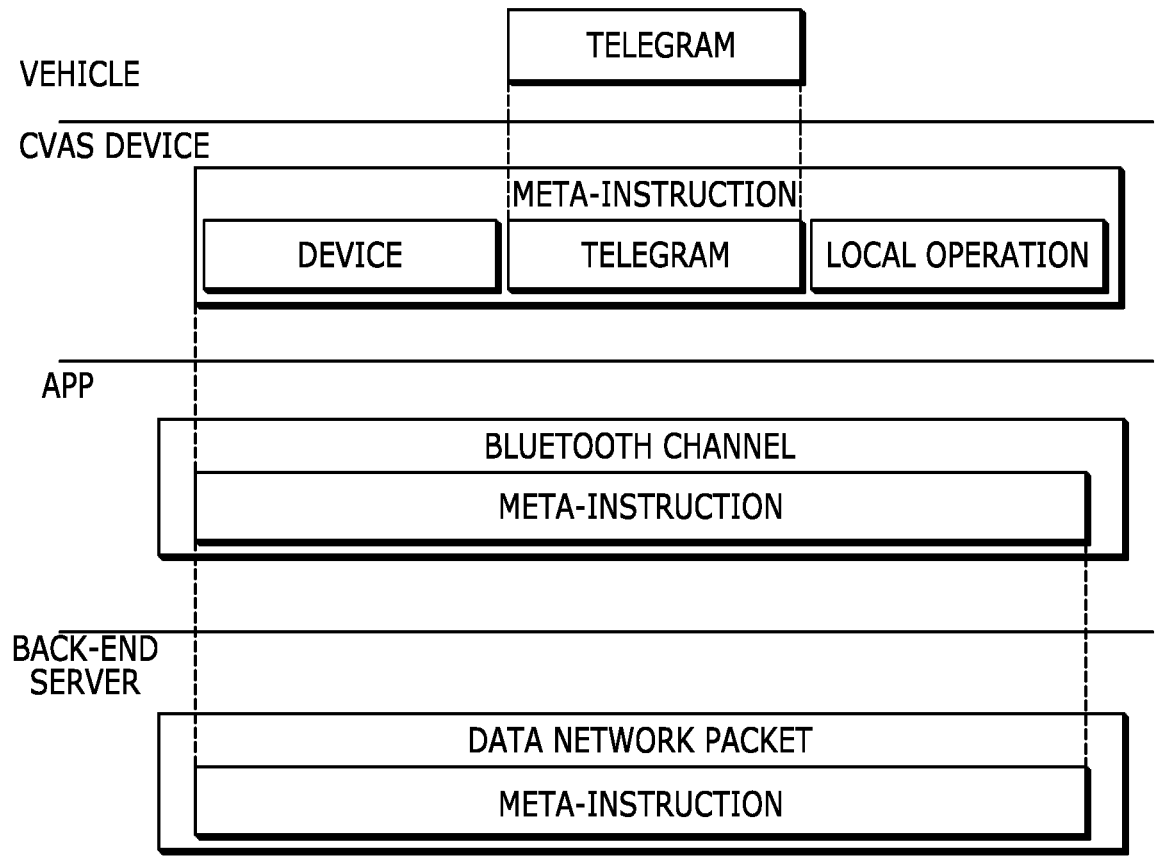
FIG. 2 is a data flow diagram that depicts a meta-instruction that is generated and sent from a back-end server to a CVAS device, which generates an RKE telegram based on the meta-instruction and then sends the RKE telegram to a vehicle.

FIG. 2 is a data flow diagram that depicts a meta-instruction that is generated and sent from a back-end server to a CVAS device, which generates an RKE telegram based on the meta-instruction and then sends the RKE telegram to a vehicle.

The meta-instruction is initially generated by the remote server and then transmitted to the CVAS device, and then used, or it can be stored on the NV (Non-Volatile) memory of the CVAS device and used later when it is needed. Since the meta-instruction doesn't contain any specific value that will be later generated by the CVAS device, it can be used multiple times.

The CVAS (Connected Vehicle Access System) device provides the capability of RF transmission between the device and the car. Also it provides communication methods to connect the device to the remote server. The CVAS device can provide Bluetooth LE communication, by which the device is connected to a smartphone, then the smartphone may connect to the remote server via an ip network.

The meta-instruction defines the RKE protocol by providing three major types of information: (1) Device Configuration as a set of RF parameters of the transceiver, (2) Template Telegram that will get transmitted to the car after localization processing, and (3) localization-processing commands containing instructions for modifying part of the template telegram.

The Device Configuration is a set of information containing the microcontroller RF transmitter register values specific to the physical characteristics of the RKE protocol, such as carrier frequency, frequency deviation in case of FSK (Frequency Keying Shift), high/low amplitude of the signal, modulation method (FSK, ASK, OOK, etc), data encoding (Manchester Encoding, NRZ, etc), baud rate, transmit power, etc.

The device configuration also contains instructions to direct the CVAS device how to set the microcontroller register values with the information contained in it.

The Template Telegram is a combination of actual data to be transmitted to the car and a place holder for data to be generated and inserted by the CVAS device after the localization processing. For example, an RKE protocol may contain 2-byte Rolling Code at 4th and 5th byte position in a telegram that gets updated to the value the vehicle gives back through a response message, incremented by 1. In such a case, the template telegram contains actual values for other fields such as Device Identifier and Command Code (unlock/lock/window open/trunk release/etc), but the template telegram keeps pseudo values at the 4th and $5^{th}$ byte positions. These pseudo values get updated by the localization processing explained below.

If the RKE protocol doesn't involve any localized processing so that the remote server can generate the whole actual telegram, then the template telegram contains actual values without any pseudo values in it. In such a case, the localization processing commands are not included in the meta-instruction.

The Localization-Processing Commands implement the RKE-protocol-specific algorithm such as how to update specific fields on the template telegram. The commands define generalized memory access method to RAM buffer and NV memory pages, plus arithmetic-operation instructions such as XOR, shift, increment, etc. The localization processing command itself is RKE-protocol agnostic, with the use of the localization commands themselves implementing the specific algorithm of the specific RKE protocol.

The meta-instruction is defined in a way that it can be interpreted by the CVAS device and thereafter executed by the device without knowing the context of the specific RKE protocol.

Figure 3:
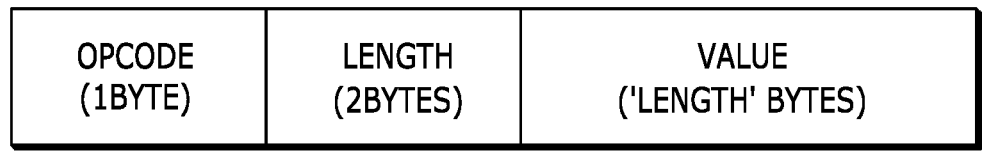
FIG. 3 depicts a meta-instruction format in accordance with embodiments of the invention.

FIG. 3 depicts a meta-instruction format in accordance with embodiments of the invention. As depicted in FIG. 2, meta-instruction may come in a format having [O(opcode) L(length) V(value)]. The opcode defines the type of value and what action needs to be done on the value. The length specifies length of the <value> field in bytes. It doesn't include the length of opcode and the length field itself. The value has numeric values that will be written to the key device's settings blocks or data frame pages.

The data configuration, template telegram, and localization processing commands are defined in this interpretive language format.

For device configuration, the value field contains actual microcontroller register values specific to the RKE protocol being implemented.

For template telegram, the value contains actual values according to the RKE protocol and pseudo values that the localization processing updates to generate authenticated telegram corresponding to the previous response from the vehicle.

For localization-processing commands, the value contains addressing specifier pointing to RAM buffer or NV memory page. The opcode instruction specifies what arithmetic or cryptology operation the device should perform.

To summarize, with conventional RKE systems, RKE commands are generated locally on the RKE key fob. When an RCK system includes a mobile device (e.g., a smartphone) between a remote-cloud-key server and a remote-cloud-key device inside a vehicle, RKE commands are generated at the RCK server. So, when a user presses the lock button in the app, the app notifies the server that a lock command is to be sent, and the server generates the lock command and sends it to the mobile app. The mobile app then sends the lock command to the RCK device in the vehicle. But, in accordance with the hybrid approach in accordance with embodiments of the invention, the RCK server will not generate a complete lock command. Instead, the RCK server will generate most of it. It will create a template, and it will send instructions to the RCK device regarding how to generate the rest of the command before the RCK device sends the command to the vehicle.

So the RCK server handles most of the differences that exist between different protocols for different types of vehicles so that a single RCK/RKE device may be used with any of the different types of vehicles. Typically, the same RKE device would not work on a different types of vehicles because the RKE device is implemented with a piece of code that is specific for that vehicle. An RCK device will work universally on many different types of vehicles because the server is creating the right commands to handle the different protocols of different types of vehicles.

In accordance with embodiments of the invention, the server generates a template and then tells the RCK device, if the RCK device is going to be used only for one vehicle, then the RCK device can simply store the template once, and then after that, every time a command is sent, instructions on how to use the template to finish generating the remaining parts of the command may be sent. And, in some cases, that is done because, sometimes, the actual missing piece of information (i.e., the data to be generated locally at the RCK device and inserted into the command to be sent to the vehicle) comes from (or is generated based on information that comes from) the vehicle. So, otherwise, for the server to generate a complete command, the missing piece of information would have to go (from the vehicle to the RCK device) back to the server, and then the server can use the information to generate the complete command and then send it back. So, instead, in accordance with embodiments of the invention, the server sends the template and instructions on how to generate and insert any information into the template using local information in order to generate the command based on the template and the locally generated data at the RCK device.

And such a hybrid approach produces significant efficiencies in making regular RKE key fobs as well. A conventional physical key fob works for one vehicle, but has different software than a key fob for other types of vehicles. But according to embodiments of the invention, key fobs that implement different protocols for different vehicles, can be running the same software, and the different protocols may be implemented by the server sending different templates to one key fob versus another key fob. And then the key fobs will implement different protocols. It's almost like configuring the key fob at the time of learning, so every key fob is learning the same piece of code, so the codes doesn't have to be compiled because all the key fobs are learning the same software, but now depending on their differences, a different template is sent from the server.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. At a connected vehicle access system (CVAS) device, a method comprising:
   receiving a Remote Keyless Entry (RKE)-protocol-specific meta-instruction that has been generated by a back-end server;
   generating an RKE telegram based on the RKE-protocol-specific meta-instruction; and
   transmitting the RKE telegram to a vehicle;
   wherein the meta-instruction comprises:
      a device configuration that specifies a set of RF parameters of a CVAS-device transceiver;
      a template telegram that contains a first set of data fields with data values from the back-end server and that contains a second set of data fields for which data values will be generated and inserted at the CVAS device; and
      localization-processing commands containing instructions for modifying the second set of data fields of the template telegram; and
   wherein the meta-instruction, which is defined in an interpretive language format, has an opcode field, a length field, and a value field, wherein the opcode field specifies arithmetic operations to be performed by the CVAS device, the length field specifies a length in bytes of the value field, and the value field includes one or more numeric values to be written to the key device.

2. The method of claim 1, wherein the instructions specify that at least one data value is to be generated based on information received from a vehicle.

3. The method of claim 1, wherein the set of RF parameters includes a plurality of parameters selected from the group consisting of: carrier frequency, frequency deviation in case of FSK (Frequency Keying Shift), high/low amplitude of the signal, modulation method, data encoding, baud rate, and transmit power.

4. The method of claim 1, further comprising: storing the meta-instruction at the CVAS device for later use by the CVAS device.

* * * * *